United States Patent [19]

Nahm

[11] Patent Number: 5,277,519

[45] Date of Patent: Jan. 11, 1994

[54] WELL DRILLING CUTTINGS DISPOSAL

[75] Inventor: James J. W. Nahm, Houston, Tex.

[73] Assignee: Shell Oil Company, Houston, Tex.

[21] Appl. No.: 964,983

[22] Filed: Oct. 22, 1992

[51] Int. Cl.$^5$ .......................... B09B 3/00; B65G 5/00
[52] U.S. Cl. .................................. 405/128; 405/263;
405/266; 166/293; 588/252; 106/790
[58] Field of Search ................ 405/128, 129, 52, 263,
405/266, 264; 166/293, 292; 106/789, 710, 790;
588/249, 252; 210/751, 747

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons ................................. 106/287 |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. ...................... 106/90 |
| 4,014,174 | 3/1977 | Mondshine . |
| 4,037,424 | 7/1977 | Anders . |
| 4,057,116 | 11/1977 | Striegler . |

(List continued on next page.)

FOREIGN PATENT DOCUMENTS 85-144069/24 7/1983 Japan .
61-48454 3/1986 Japan .
833704 6/1981 U.S.S.R. .

OTHER PUBLICATIONS

"Deep Cement Mixing Experience in Japan", by G. Dennis et al, Copyright 1985 Seabed Strengthening Symposium, Denver, Col., Jun. 4, 1985, TP 85-5.
"Mud Disposal: An Industry Perspective", Hanson et al, Drilling, May 1986, pp. 16-21.
"Waste Minimization Program Can Reduce Drilling Costs", Hall et al, Oryx Energy Co., Houston, Tex., Oil & Gas Journal, Jul. 1, 1991, pp. 43-46.
"Phosphoric Acids and Phosphates", Kirk-Othmer Enc. of Chemical Technology, 3rd Ed., vol. 17, p. 477.
"Conversion of Drilling Fluids to Cements with Blast Furnace Slag-Performance Properties and Applications for Well Cementing", SPE Paper 24575, Oct. 4, 1992, by Cowan et al.
"Quantitative Interpretation of X-Ray Diffraction Patterns of Mixtures.I.Matrix-Flushing Method for Quantitative Multicomponent Analysis", by Frank H. Chung, J. Appl. Cryst. (1974) 7, pp. 519-525.

*Primary Examiner*—Dennis L. Taylor

[57] ABSTRACT

Drilled cuttings are disposed of by solidification by drilling with a drilling fluid containing blast furnace slag, thereby producing drilled cuttings and other solid wastes, concentrating the wastes and then solidifying the concentrated wastes. Drilling wastes solidified by blast furnace slag are hard and unleachable and the blast furnace slag is compatible with both oil and water based drilling muds and drilled cuttings. Drilling fluids therefore do not have to be removed from the drilled cuttings prior to solidification in a mud pit.

12 Claims, No Drawings

U.S. PATENT DOCUMENTS

| | | | |
|---|---|---|---|
| 4,215,952 | 8/1980 | Baardsen . | |
| 4,252,471 | 2/1981 | Straub . | |
| 4,335,980 | 6/1982 | DePriester . | |
| 4,338,134 | 7/1982 | Graf zu Munster . | |
| 4,425,055 | 1/1984 | Tiedemann . | |
| 4,427,320 | 1/1984 | Bhula . | |
| 4,450,009 | 5/1984 | Childs et al. . | |
| 4,460,292 | 7/1984 | Durham et al. . | |
| 4,518,508 | 5/1985 | Conner | 210/751 |
| 4,643,617 | 2/1987 | Kanno et al. | 405/222 |
| 4,664,843 | 5/1987 | Burba, III et al. . | |
| 4,668,128 | 5/1987 | Hartley et al. . | |
| 4,674,574 | 6/1987 | Savoly et al. | 166/293 |
| 4,690,589 | 9/1987 | Owa | 405/263 |
| 4,692,065 | 9/1987 | Suzuki et al. | 405/211 |
| 4,720,214 | 1/1988 | Brasted et al. . | |
| 4,746,245 | 5/1988 | Mork | 405/224 |
| 4,760,882 | 8/1988 | Novak . | |
| 4,761,183 | 8/1988 | Clarke . | |
| 4,790,954 | 12/1988 | Burba, III et al. . | |
| 4,880,468 | 11/1989 | Bowlin et al. . | |
| 4,895,665 | 1/1990 | Colelli et al. | 175/66 X |
| 4,897,119 | 1/1990 | Clarke . | |
| 4,913,585 | 4/1990 | Thompson et al. . | |
| 4,942,929 | 7/1990 | Malachosky et al. . | |
| 4,991,668 | 2/1991 | Rehm et al. . | |
| 5,016,711 | 5/1991 | Cowan . | |
| 5,020,598 | 6/1991 | Cowan et al. | 166/293 |
| 5,026,215 | 6/1991 | Clarke . | |
| 5,058,679 | 10/1991 | Hale et al. . | |
| 5,082,499 | 1/1992 | Shen | 106/735 |
| 5,086,850 | 2/1992 | Harris et al. . | |
| 5,105,885 | 4/1992 | Bray et al. . | |
| 5,106,423 | 4/1992 | Clarke . | |
| 5,121,795 | 6/1992 | Ewert et al. . | |
| 5,123,487 | 6/1992 | Harris et al. . | |
| 5,125,455 | 6/1992 | Harris et al. . | |
| 5,127,473 | 7/1992 | Harris et al. . | |
| 5,129,469 | 7/1992 | Jackson | 405/128 X |
| 5,133,806 | 7/1992 | Sakamoto et al. | 106/811 |
| 5,147,565 | 9/1992 | Bour et al. | 252/8.551 |
| 5,213,160 | 5/1993 | Nahm et al. | 166/293 |
| 5,213,446 | 5/1993 | DoVan | 405/128 |
| 5,226,749 | 7/1993 | Perkins | 405/266 |

5,277,519

WELL DRILLING CUTTINGS DISPOSAL

FIELD OF THE INVENTION

The present invention relates to a method of disposal of drilled cuttings and other drilling waste products

BACKGROUND TO THE INVENTION

Reducing both the creation of solid wastes and the cost of solid waste disposal has become very important in drilling of oil and gas wells. Stiffer environmental regulations, "cradle to grave" liability for solid wastes, and increased landowner restrictions have contributed to considerable increases in the cost of disposal of solid wastes. Generally, wastes such as drilling wastes have been disposed of by burial, solidification, landfarming, annular injection and commercial disposal. Each of these methods has drawbacks.

Commercial disposal of drilling wastes is very expensive, and can be only a temporary disposition for solid wastes because the originator can be found liable for remediation of disposal sites at a later time.

Burial, solidification and landfarming typically require that drilling fluids be removed from the drilled solids. Removal of drilling fluids from drilled cuttings is particularly important when oil based or emulsion drilling fluids are used due to the contamination by the oil component. Removal of the drilling fluids in turn results in generation of other forms of wastes.

Solidification of wastes is disclosed in U.S. Pat. Nos. 4,880,468 and 4,338,134. Patent '468 discloses combining hygroscopic material and a cementitious binder to material with drilling wastes to solidify drilling wastes The cementitious binder is a Portland cement. Patent '134 discloses fixation of wastes with hydraulic mortar to enable easier disposal of the wastes. Injection of drilling wastes into an injection well is disclosed in U.S. Pat. No. 4,942,929. Larger drilled cuttings are recovered, washed and used as construction gravel and smaller solids are separated from drilling fluids and pumped into a formation through the injection well.

Solidification also typically requires removal of residual drilling fluids from drilled cuttings because drilling fluids and cements are usually incompatible. Most water based drilling muds will either cause instant setting of the cement or act as retarders of the cement setting. Strength of the set cement is also adversely affected by the presence of most drilling fluids.

Solidification of the drilled solids in cement can fix contaminants and greatly reduce the expense of disposal, but solidification within cements has not been widely practiced due to the expense of cementing materials and the expense of removing incompatible drilling fluids.

U.S. Pat. Nos. 3,168,139 and 3,499,491 disclose the conversion of drilling fluids to wellbore cement slurries. Conversion of drilling fluids to cement slurries eliminates the need to dispose of used muds and eliminates the need to provide some additives that are already present in the drilling fluids, such as fluid loss and free water control additives. U.S. Pat. No. 5,058,679 discloses a process to convert fluid to a wellbore cement slurry by adding blast furnace slag to acceptable drilling fluids. The use of blast furnace slag instead of Portland cement provides for a slurry that is very compatible with the original drilling fluid resulting in many significant technical advantages. The use of the blast furnace slag as the cementitious compound also significantly reduces the cost of converting the drilling fluids to cement compared to the use of Portland cement as the cementitous compound.

It is therefore an object of the present invention to provide a method to fix leachable materials in drilling solid wastes contaminated with drilling fluids by solidification wherein removal of drilling fluids from the drilling cuttings prior to solidification is not necessary. It is an additional object to provide a method to solidify drilled cuttings wherein the cementitious compound is blast furnace slag. It is another object of the present invention to provide a method of incorporating blast furnace slag into the drilled wastes by adding slag to drilling fluids used for drilling a wellbore.

SUMMARY OF THE INVENTION

These and other objects are accomplished by a method to fix leachable materials in drilled cuttings and other drilling wastes contaminated with drilling fluid comprising the steps of: drilling a wellbore using a drilling fluid comprising blast furnace slag and thereby creating drilled solid wastes in the drilling fluid; concentrating the drilled solid wastes to form concentrated drilled solid wastes contaminated with drilling fluid; and solidifying the drilled solid wastes contaminated with drilling fluid. The solidification caused by blast furnace slag and activators fixes the drilling fluid and other contaminants and significantly increases the ease of disposal of the solids by either leaving solidified wastes at the drilling site in the mud pit or by such methods as landfarming and landfill. Solidifying the wastes in a mud pit at the drilling site is preferred. The solidified wastes have been found to be resistant to leaching of such contaminants as salts and organics from the solidified solids.

Utilization of blast furnace slag in drilling fluids results in some blast furnace slag being present in the solid wastes produced by drilling.

Additional blast furnace slag can be directly added to drilled solids and other solid wastes which are not contaminated with blast furnace slag or supplemented to the contaminated wastes using a suitable mixing method. A quick setting slurry can be prepared by mixing some drilling fluid or drilled wastes with blast furnace slag and pumping over the main body of solidified mass to provide a rain cap. Additional amounts of blast furnace slag and activators may be added at a suitable point where drilling fluid and drilled solids are discharged from the drilling system in order to accelerate the setting time and to provide additional axial compressive strength when set.

DETAILED DESCRIPTION OF THE INVENTION

Solidification of drilled solid wastes is accomplished by the use of blast furnace slag containing drilling fluids. The term blast furnace slag refers to the refuse from the melting of metals or reductions of ores in a blast furnace. Blast furnace slag is a by-product of the manufacture of steel in a blast furnace. In steel making, the blast furnace slag is discharged from the furnace as a molten stream at temperatures typically between 1400° C. and 1600° C. Rapid quenching of the slag results in its conversion into a material which is hydraulic. Hydraulic is defined as capable of forming a cementitious solid when mixed with water. Rapid quenching of the slag converts it into a glassy state and it is generally recognized that the hydraulic quality of the slag depends upon the effectiveness of the process used to rapidly cool the slag and freeze it into the granulated, glassy, non-crystalline state. It is then ground into a fine powder to provide sufficient surface area for reaction.

Components of blast furnace slag include silicon dioxides, aluminum oxides, iron oxides, calcium oxide, magnesium oxide, sodium oxide and potassium oxide. The actual components present and the amounts of these components, vary because the optimum furnace operations vary with the metals or ores being processed. Hence, there is seldom any significant flexibility to adjust the chemical composition of the slag to improve hydraulicity.

Because the quenching process directly influences the hydraulicity, determination of hydraulic properties through chemical analysis has limited value. Two slags having the same general chemical composition can have significantly different hydraulicity due to the quenching process and its effectiveness. The glass content of the slags increases with the rate of cooling and water quenching produces a very high cooling rate. Air quenching often produces slags with various levels of glass content due to differences in cooling rates. Smaller particles have a higher glass content due to faster cooling while the larger particles cool more slowly and have a lower glass content. Therefore, the selection of a cementitious blast furnace slag for this invention is best determined by a direct performance (strength) test of the slag mixed with water to evaluate the slag's hydraulicity.

The preferred blast furnace slag of the invention is a high glass content slag produced by quickly quenching the molten slag through intimate contact with large volumes of cool water. Slags produced by air quenching may be used in the invention provided they are determined to have cementitious properties. However, they are less desirable.

The fineness of the ground slag should be between about 2000 cm$^2$/g and 20,000 cm$^2$/g and more preferably between 3000 cm$^2$/g and most preferably between 4000 and 3000 cm$^2$/g and 9000 cm$^2$/g and most preferably between 4000 and 6500 cm$^2$/g. One commercially available blast furnace slag which fulfills the requirements of the invention is marketed under the trade name NEWCEM by the Blue Circle Atlantic Company. This slag is obtained from the Bethlehem Steel Corporation, Sparrows Point, MD. Other brands are also available and usable.

Activators which may be used to decrease setting and hardening time include alkali metal oxides and hydroxides; alkali and transition metal carbonates, sulfates, nitrates and nitrites; and alkali metal halides. Examples of such compounds include sodium hydroxide, calcium oxide, calcium hydroxide, magnesium hydroxide, magnesium oxide, sodium carbonate, sodium sulfate, calcium sulfate, calcium nitrate, calcium nitrite, zinc oxide, zinc carbonate, titanium carbonate, potassium hydroxide, potassium carbonate, potassium sulfate, potassium nitrate, potassium nitrite, copper sulfate, sodium fluoride, lithium hydroxide, and lithium carbonate. These components are also referred to as activators.

Rheological properties of the blast furnace slag-containing drilling fluids can be modified, if necessary, by conventional chemical dispersants for water-based drilling fluids. Examples of such compounds include: lignosulfonates, naphthalene sulfonates, phenol sulfonates, phosphates, sulfonated styrene maleic anhydride (SSMA), sulfonated toluene maleic anhydride (SMTA), sulfonated styrene maleimide (SSMI), polyacrylates, polymethacrylates, blends of polyacrylates and polymethacrylates, acrylamide-acrylic acid copolymers, or blends of any of these classes of materials provided they are chemically compatible to allow their mixing while retaining the ability to disperse particles in the drilling fluid. These additives do not prevent the solidification of the drilled solid wastes according to the present invention even though additional activators may be necessary to counteract retardation effect.

Salts and hydrocarbons may be present in the drilling fluid of the present invention. Solidification of the drilled solid wastes is not hampered by the presence of such salts. This is not the case in the prior art processes that utilize Portland-type cements to solidify drilling wastes. Salts, particularly divalent salts, and hydrocarbons interfere with setting of Portland cement.

Water must be present in the concentrated drilled wastes for combination with blast furnace slag to form the cementitious material. The water may be present in sufficient quantities in the waste stream, or may be added to the drilled solids prior to solidifying the drilled solids. Water must be a continuous phase in the liquid phase of the waste stream although liquid hydrocarbons can also be present. A sufficient amount of water must be in the slurry to form a strong solid mass upon hydrolysis of the blast furnace slag. This will typically be between about 5 and about 100 percent by weight based on the weight of blast furnace slag.

The water used to prepare the slurry of the present invention is preferably supplied by using the old drilling fluid. The drilling fluid must generally be disposed of when the well is completed and thus its use in the present invention then serves as a disposition of the cuttings, other solid wastes and the drilling fluid itself. Additionally, the drilling fluid may contain additives and viscosifiers that are useful in maintaining the cuttings in suspension in the slurry until the slurry has set.

The drilling wastes of the present invention may comprise cuttings circulated from the drill bit to the surface by drilling fluid and separated from the drilling fluid by known means such as a shaker screen or by gravity settlement from the fluid in a mud pit or tank. The cuttings may be ground to a smaller average size by a means such as circulation through a centrificial pump although this is not necessary in the practice of the present invention. Reduction of the average particle size increases the time the cuttings will remain in suspension in a slurry and therefore can increase the strength of the solidified wastes.

Total removal of drilling fluids or washing of the drilling fluids from the cuttings is not necessary and is not preferred. The drilling fluids may be decanted from the cuttings to concentrate the cuttings to be disposed, but if disposal of decanted drilling fluid is also desired, the excess drilling fluid can be solidified by the process of the present invention. When the drilling fluids are decanted from the cuttings, the remaining cuttings may contain from about one to about twenty percent by weight of drilling fluids.

Concentration of drilling solid wastes may be accomplished by any known means. For example, shale shakers are typically used to sieve larger cuttings from circulating drilling muds. Circulating mud that has passed through the shale shaker is then typically routed to a mud pit. In the mud pit, smaller cuttings are allowed to settle. Drilling fluids are then generally circulated back into the drilling operation. Other methods to separate solids from liquid streams, such as desilters, desanders, centrifuges and filters, could also be used.

Solidification of the drilling wastes contaminated with oil is provided according to the present invention when the wellbore is drilled using an oil based or an emulsion type drilling fluid. The normal disposal of these oil contaminated drilling wastes is otherwise more difficult and expensive, but such drilling wastes can be conveniently solidified, and the contaminants fixed, by the present invention.

Generally, between about 10 and about 60 percent by weight of the concentrated drilled solid wastes may be drilled cuttings. The slurry further comprises about five to about forty percent by weight of the cuttings of blast furnace slag. Less slag results in a hardened slurry having a low strength and more blast furnace slag increases the cost of the disposal of the cuttings unnecessarily.

A blast furnace slag containing drilling fluid can be prepared by adding 5 to 100 lb/bbl blast furnace slag to an ordinary drilling fluid and used it as a drilling fluid in drilling a wellbore. The amount of the blast furnace slag needed depended upon the drilling conditions and drilling fluid density and other fluid properties. The amounts of blast furnace slag present in the drilling fluid may also influence the rate of hardening of the treated drilled cuttings and other drilled wastes and the final compressive strength after these wastes are solidified. This drilling fluid containing blast furnace slag is normally treated with suitable mud thinners or other additives to prevent high viscosity or gel strengths during drilling and storage.

EXAMPLES

A blast furnace slag containing drilling fluid was prepared by adding 60 lb/bbl NEWCEM in a 12.4 lb/gal saltwater (10% by weight) PHPA (partially hydrolyzed polyacrylamide) mud received from a deepwater well located (Auger Prospect) in the Gulf of Mexico. This blast furnace containing drilling fluid did not set or harden at ambient conditions in 20 days. The blast furnace containing drilling fluid was then activated by adding 5.5 lb/bbl caustic soda and 8 lb/bbl sodium sulfate to this fluid. The activated drilling fluid developed an axial compressive strength of 240 psi in 2 days at ambient conditions.

A slurry of drilled cuttings from a Gulf of Mexico well drilled with oil-based drilling fluid was prepared containing 21.4 percent by weight solids in seawater. Blast furnace slag was added to samples of this slurry in concentrations of 125 and 250 pounds per barrel of slurry. The blast furnace slag was NEWCEM available from Blue Circle Atlantic, Inc. Five pounds per barrel of slurry each of sodium hydroxide and soda ash were also added to the slurry. After incubation at 150° F. for 48 hours the samples had hardened and had axial compressive strengths of 623 and 1253 psi respectively. Samples which were left at room temperature for 167 hours had hardened and had axial compressive strengths of 410 and 1052 psi respectively. This example demonstrates the ability of blast furnace slag to dispose of oil drilling fluid contaminated drilled cuttings.

Another sample of fluid contaminated drilled cuttings was obtained from a well in the Wasson Field of West Texas. The well was drilled with 10 lb/gal salt-saturated drilling mud. Blast furnace slag (NEWCEM) in an amount of about 5 percent by weight based on the cuttings was mixed with the cuttings. The mixture was interlayered and not mechanically mixed to model the addition of blast furnace slag to a reserve pit at a drilling site. The mixture set to a solid within four weeks under ambient conditions.

A second sample of the Wasson Field drilled cuttings was combined with 20 percent by weight of NEWCEM, based on the weight of the cuttings, and 10 percent by weight of sodium hydroxide, based on the weight of the NEWCEM. The mixture hardened and after curing for about 12 days at ambient conditions had an axial compressive strength of about 3500 psi.

A third sample of the Wasson Field drilled cuttings was combined with 10 percent by weight of NEWCEM, based on the weight of the cuttings, and 10 percent by weight of sodium hydroxide, based on the weight of the NEWCEM. This sample also hardened and after curing for about 12 days at ambient conditions had an axial compressive strength of about 1400 psi.

Drilling fluids were decanted from the drilled cutting samples used in the foregoing examples, but the cuttings were 15 not otherwise washed or cleaned. The drilling fluids were sufficiently compatible with the slag cement slurry that cleaning drilling fluid from the cuttings was not necessary.

These examples demonstrate that a strong cement can be prepared containing drilled cuttings from a slurry that is compatible with drilling fluids.

Two samples of cuttings set with blast furnace slag were prepared using cuttings from a West Texas well. One sample was prepared by mixing the cuttings with 5% blast furnace slag (by weight of cuttings) and 10% (by weight of blast furnace slag) of a 3:1 sodium hydroxide/soda ash mixture. The other sample was prepared by mixing the cuttings with 30% blast furnace slag and 10% 3:1 sodium hydroxide/soda ash mixture. These samples developed a very high compressive strength at ambient temperature.

The two solidified samples were analyzed for leachable volatile organics, semivolatile organics, and metals, according to the Toxicity Characteristic Leaching Procedure (TCLP). No TCLP analyte was detected in the samples except for a low level of barium (both about 0.17 ppm or less). The regulatory limit for barium is 100 ppm.

All analyses were performed according to the methodology outlined in the Test Methods for Evaluating Solid Waste, US/EPA SW-846, third edition. The solidified drilled cuttings were crushed to reduce particle size to below one cm diameter and then extracted according to the TCLP extraction Method 1311. The extraction fluid was analyzed for volatile organics by Method 8240; semivolatile organics by Method 8270; and metals by Methods 3010/6010 and 3010/7470 for mercury. Although the TCLP protocol calls for the analysis of pesticides and herbicides, due to the nature of these samples, these species would not be present and, therefore, these analyses were not performed.

These examples demonstrate the ability of blast furnace slag to fix salts and other drilling waste contaminants.

The foregoing description of the invention and examples of the invention are explanatory of the invention, and various changes in details of the described invention may be made within the scope of the following claims.

I claim:

1. A method to fix leachable materials in drilling solid wastes contaminated with drilling fluids comprising the steps of:

drilling a wellbore using a drilling fluid comprising blast furnace slag and thereby creating drilled solid wastes in the drilling fluid;

concentrating the drilled solid wastes to form concentrated drilled solid wastes contaminated with drilling fluid; and solidifying the drilled solid wastes contaminated with drilling fluid.

2. The method of claim 1 wherein the drilled solid wastes are solidified in a mud pit at the drilling site.

3. The method of claim 1 wherein an activator is added to the concentrated drilled solids to decrease the hardening time.

4. The method of claim 3 wherein the activator is selected from the group consisting of sodium hydroxide, calcium oxide, calcium hydroxide, magnesium hydroxide, magnesium oxide, sodium carbonate, sodium sulfate, calcium sulfate, calcium nitrate, calcium nitrite, zinc oxide, zinc carbonate, titanium carbonate, potassium hydroxide, potassium carbonate, potassium sulfate, potassium nitrate, potassium nitrite, copper sulfate, and sodium fluoride, lithium hydroxide and lithium carbonate.

5. The method of claim 2 further comprising the step of providing a raincap on the solidified drilled solid wastes by covering the solid wastes in the mud pit with drilling fluid comprising an amount of blast furnace slag effective to form a rain cap that is impermeable to water and has an axial compressive strength in excess of about 500 psi.

6. The method of claim 1 wherein the drilling fluid comprises between 5 and 100 lb/bbl blast furnace slag.

7. The method of claim 1 wherein the slurry comprises between about 5 and about 40 percent blast furnace slag by weight of solids.

8. The method of claim 7 wherein the drilled cuttings comprise between about 10 and about 90 percent by weight of the drilled solid wastes.

9. The method of claim 1 wherein the drilled cuttings are contaminated with between about 5 and about 40 percent by weight of drilling fluid.

10. The method of claim 9 wherein in the concentrated drilled solid wastes are contaminated with between about one and about twenty percent by weight of drilling fluid containing blast furnace slag.

11. The method of claim 10 wherein the drilling fluid is an invert oil emulsion type drilling fluid.

12. The method of claim 5 wherein the blast furnace slag utilized to form the rain cap over the mud pit comprises excess wellbore annulus cementing slurry.

* * * * *